(12) United States Patent
Liu

(10) Patent No.: US 8,000,565 B2
(45) Date of Patent: Aug. 16, 2011

(54) BURIED DUAL TAPER WAVEGUIDE FOR PASSIVE ALIGNMENT AND PHOTONIC INTEGRATION

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/347,069

(22) Filed: Dec. 31, 2008

(65) Prior Publication Data

US 2010/0166361 A1    Jul. 1, 2010

(51) Int. Cl.
*G02B 6/12* (2006.01)
*G02B 6/10* (2006.01)
*G02B 6/34* (2006.01)
*G02B 6/32* (2006.01)

(52) U.S. Cl. ............. 385/14; 385/37; 385/43; 385/131; 385/132

(58) Field of Classification Search .................. 385/129, 385/14, 37, 131, 43, 132; 438/31; 257/E21.002
See application file for complete search history.

(56) References Cited

U.S. PATENT DOCUMENTS

| | | | |
|---|---|---|---|
| 7,088,890 B2* | 8/2006 | Liu .................................. 385/43 |
| 2004/0017976 A1* | 1/2004 | Luo et al. ......................... 385/43 |
| 2005/0152658 A1* | 7/2005 | Keyser ........................... 385/129 |
| 2008/0138008 A1* | 6/2008 | Tolstikhin et al. .............. 385/14 |

\* cited by examiner

*Primary Examiner* — Mark A Robinson
*Assistant Examiner* — Michael P Mooney
(74) *Attorney, Agent, or Firm* — Kevin A. Reif

(57) ABSTRACT

A buried dual taper waveguide has a flat surface after taper processing thus facilitating further processing with more complex photonic integrated circuits. This allows for light coupling between a large core size fiber and a small waveguide photonic integrated circuit. The taper structure disclosed enables monolithic integration of silicon photonic components and passive alignment for low-cost packaging.

6 Claims, 5 Drawing Sheets

BURIED DUAL TAPER WAVEGUIDE FOR PASSIVE ALIGNMENT AND PHOTONIC INTEGRATION

FIELD OF THE INVENTION

Embodiments of the present invention relate to waveguides, and more particularly, to tapered optical waveguides.

BACKGROUND INFORMATION

Efficient light coupling between an optical fiber and a silicon waveguide is highly desired for silicon based photonic device and circuit applications. Due to the high refractive index contrast of silicon waveguide systems, obtaining good fiber-silicon waveguide coupling is very challenging particularly for small silicon rib waveguides.

Often is the case that an optical device includes a fiber or waveguide that is intended to be coupled to another waveguide having a significantly larger/smaller cross-sectional size. For example, a planar lightwave circuit (PLC) can have a waveguide on the order of four microns in height to be coupled to an optical fiber with a diameter of about ten microns. One way to couple a port of a relatively large waveguide to a port of a significantly smaller waveguide is by forming a tapered waveguide structure to couple the two waveguides.

U.S. Pat. No. 7,088,890, commonly assigned to Intel Corporation, shows a tapered rib waveguide. As shown in FIG. 1, a waveguide 100 may be formed on a silicon-on-insulator (SOI) substrate comprising an insulation layer 102 and a silicon layer 104. The waveguide 100 generally comprises a tapered section 106 and a final waveguide or rib section 108, shown divided by illustrative line 111. The tapered section 106 comprises a lower taper 110 and an upper, generally wedge shaped taper 112. The upper taper 112 and lower taper 110 include an input facet 114 which may be integrally formed. The lower taper 110 gradually tapers down over length "L" to match the size of an output waveguide 116 in section 108. The upper taper 112 may taper to a point 118 to be generally wedge shaped. This type of waveguide taper 100 may be used to provide high coupling efficiency (coupling loss <1 dB/facet) between a standard fiber (with a modal diameter of ~9 μm) coupled at the input facet 114 and silicon waveguide 116 with a width or height of ~4-5 μm.

As above, the taper may be fabricated by etching a silicon-on-insulator substrate with a thick epitaxial layer. This may result in a large difference between the taper height and final photonic waveguide height. Such a topology on the silicon wafer may make it harder to fabricate photonic components together with silicon taper.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Described is a buried dual taper waveguide that has a flat surface after taper processing thus facilitating further processing with a more complex photonic integrated circuit. This allows for light coupling between a large core size fiber and a small waveguide photonic integrated circuit. The taper structure disclosed enables monolithic integration of silicon photonic components and passive alignment for low-cost packaging.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments are directed to a waveguide taper that can be used for efficient light coupling between a large core size fiber and a small waveguide (3-5 um height) photonic integrated circuit. This may include, for example, a small-form factor (SFF) demultiplexer or a fast (20-40 Gb/s) Ge detector array. A standard single mode fiber has core size of ~9 um, while a multi-mode fiber has a core size of 50-100 um. Note that the large core single mode fiber exists, for example, as a commercially available photonic crystal fiber has core size of 35 um. Using a large core size fiber and a large size taper input facet, one can use low-cost passive alignment techniques for photonic chip-fiber packaging. Due to the performance requirements, a photonic integrated circuit is usually fabricated on a platform with small waveguides.

Embodiments address a difficult processing issue. For a traditional taper starting with a thick silicon waveguide, the taper waveguide and final photonic waveguide has a very large height difference. Such a large topography makes the process of an integrated photonic circuit (for instance, integration of high-speed Ge detectors and small-form factor Echelle gratings) very difficult. Because the proposed taper has a flat top surface (top of the taper and the final waveguide have the same height), the integrated circuit process may be easily carried out.

Figure 1:
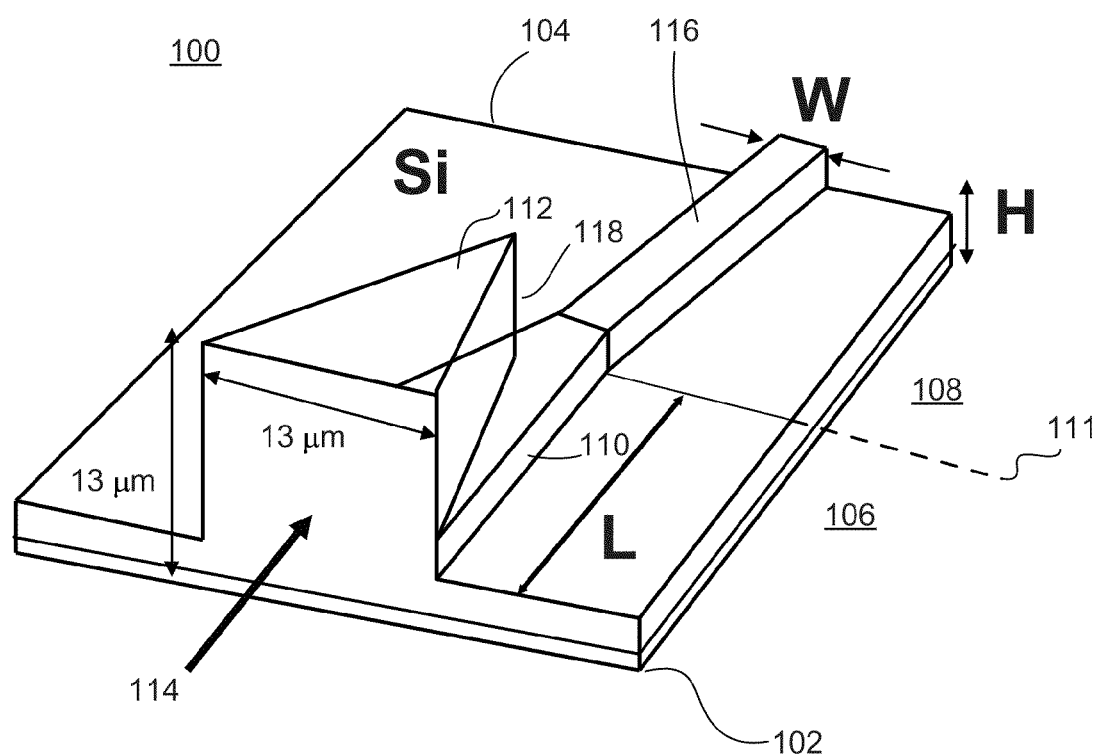
FIG. 1 is a block diagram of a related art taper rib waveguide.
Figure 2:
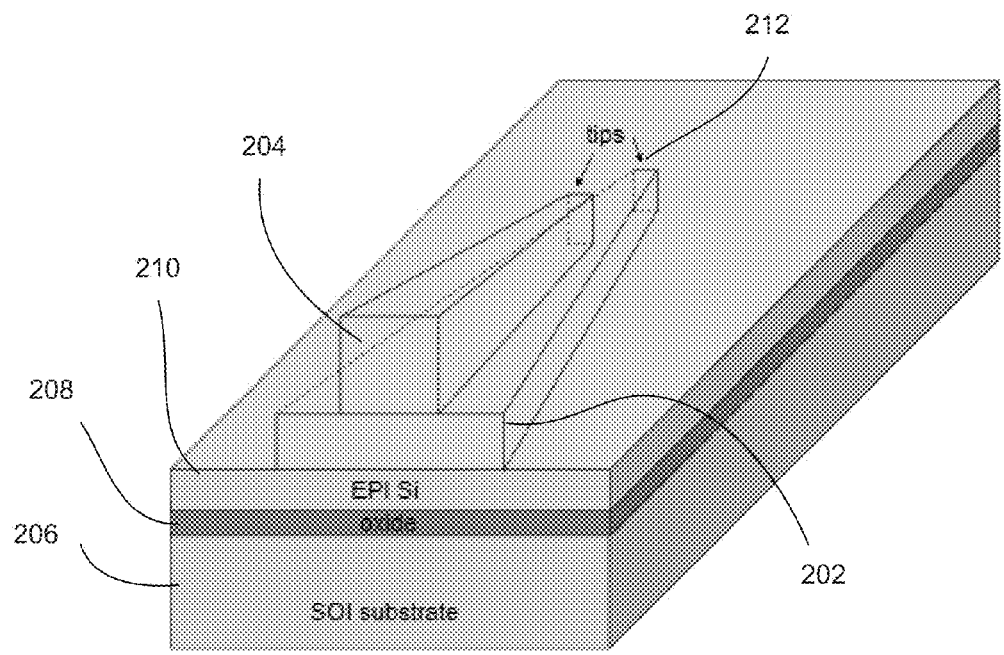
FIG. 2 is a block diagram of a buried dual taper waveguide during initial processing according to one embodiment.

Referring now to FIG. 2, there is shown a taper structure that comprises a two-stage (dual) etched waveguide taper including a first waveguide 202 and a second waveguide 204 on top of a SOI wafer. The SOI wafer includes a substrate portion 206, an oxide layer 208 and a EPI layer 210. The taper size may be about 20-30 um dependent on specific applications.

The dual taper proposed ensures a low transmission loss with a waveguide height tapering from about 20-30 (taper input) to about 3-5 um (final waveguide) at the tip 212. The large taper input is provided for large fiber coupling tolerance, but small final waveguide is provided for the device performance and form factor.

Figure 3:
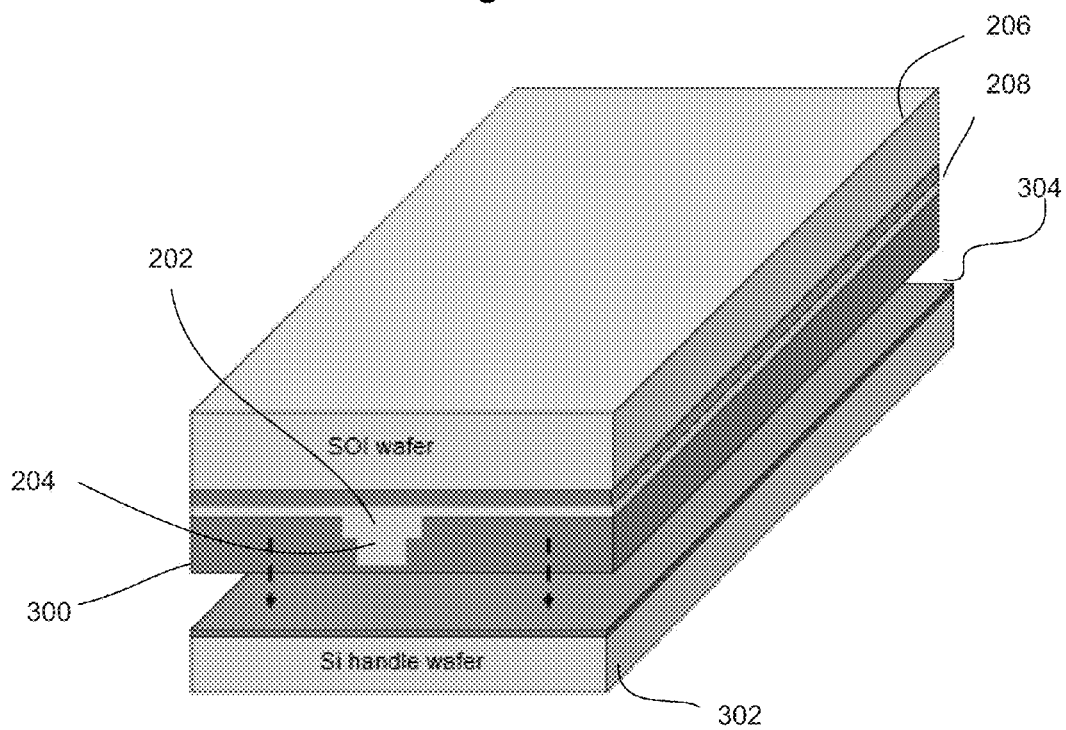
FIG. 3 is block diagram of the dual taper waveguide from FIG. 2, flipped for boding to a handle wafer.

As shown in FIG. 3, after taper etching and possible waveguide sidewall smoothing with, for example, thermal oxide or hydrogen anneal, a thick oxide layer 300 is deposited on the top of the dual taper. The oxide layer 300 may be, for example 20-30 um thick. The oxide layer 300 is then planarized by chemical-mechanical polishing (CMP) technique. As shown in FIG. 3, the processed SOI wafer is then inverted or flipped over and wafer bonded with a silicon handle wafer 302 having an oxide layer 304 on its top surface to join with the oxide layer 208 from FIG. 2.

Figure 4:
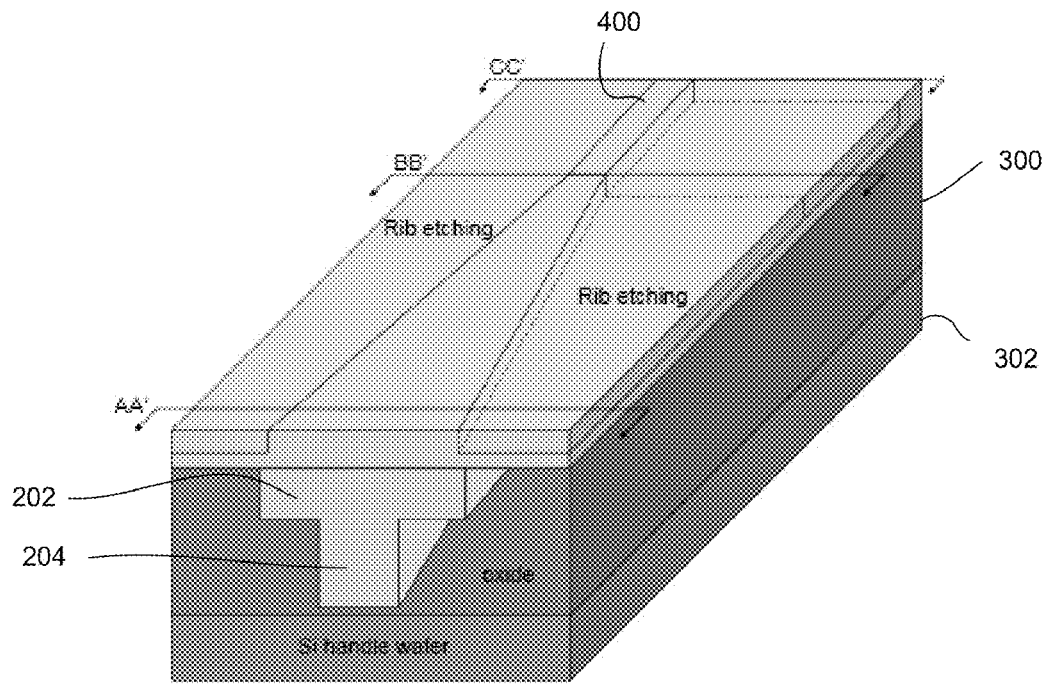
FIG. 4 is block diagram of the dual taper waveguide from FIG. 3 with a smooth surface for rib etching and ready for further IC processing.

As illustrated in FIG. 4, the SOI substrate 206 and buried oxide 208 are then removed. Thus, using the handle wafer 302, a flat surface taper-processed silicon wafer may be produced. A tapered rib waveguide 400 may then be etched to complete the taper fabrication.

Figures 5A, 5B:
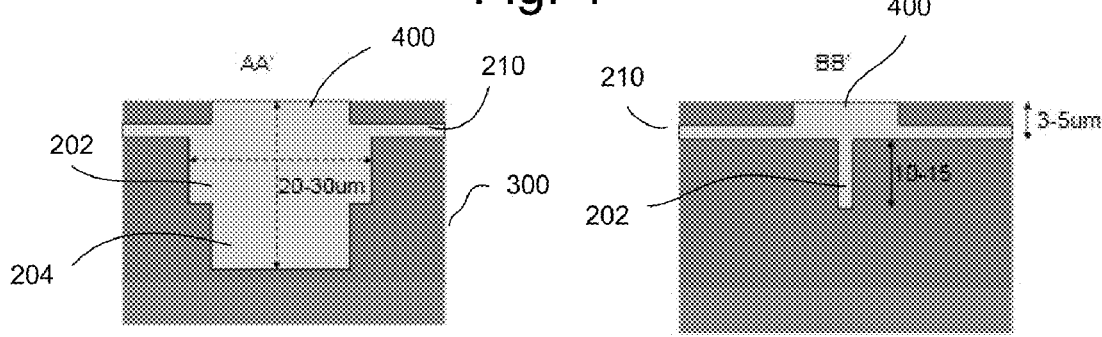
FIGS. 5A, 5B, and 5C are cross sectional views of the dual taper waveguide from FIG. 4.
Figure 5C:
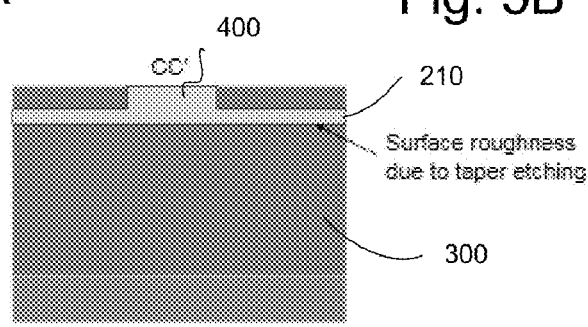

FIGS. 5A, 5B, and 5C illustrate the cross sectional views taken along lines AA', BB' and CC' from FIG. 4, respectively. The larger input section of the waveguide is shown in FIG. 5A taken along cross sectional line AA' comprise the first waveguide 202 and the second waveguide 204 and the wider rib section 400. FIG. 5B, taken along cross sectional line BB', is the thinner or output section of the waveguide. The second waveguide 204 may have already terminated and only the thin tip of the first waveguide 202 may remain. FIG. 5C, taken along cross sectional line CC' shows just the final rib waveguide section 400.

Figure 6:
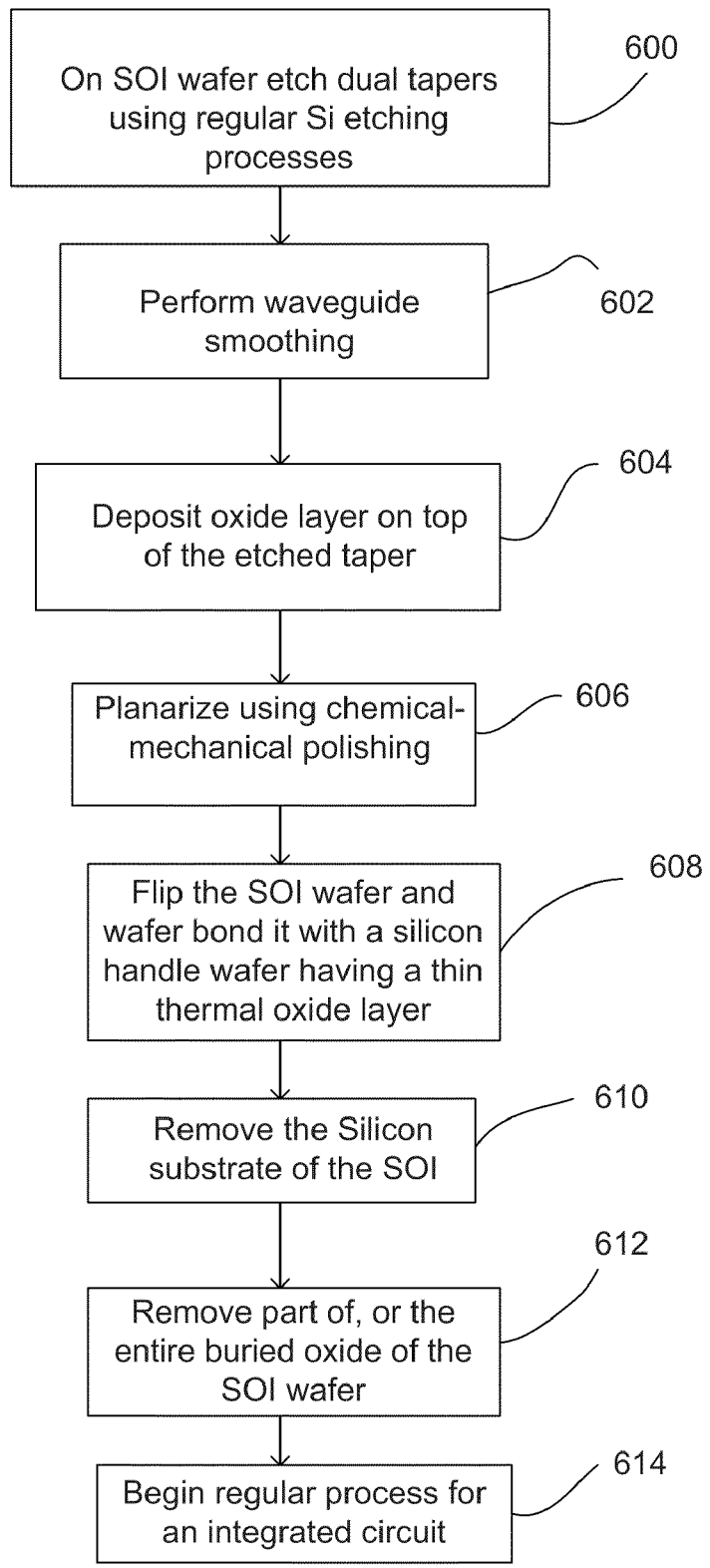
FIG. 6 is a flow diagram showing processing steps for one embodiment of making the dual taper waveguide.

FIG. 6 is a flow diagram illustrating the basic process for fabricating a waveguide according to one embodiment of the invention. In block 600 the dual tapers are etched on an SOI wafer using standard processing techniques. In box 602, the waveguides may be smoothed. In box 604 a layer of oxide may be deposited on the etched wafer and then planarized to make smoother in box 606 using, for example chemical/mechanical polishing techniques. In box 608, the SOI wafer is flipped and bonded to a silicon handle wafer for further processing. Once flipped onto the handle wafer, the bottom of the SOI wafer is now on top facilitating removal of the silicon substrate portion of the SOI wafer in box 601 and removal of all or part of the buried oxide layer in box 612. Finally, in box 614 the waveguide prepared according to embodiments of the invention may be ready for further IC fabrication processes.

Figure 7:
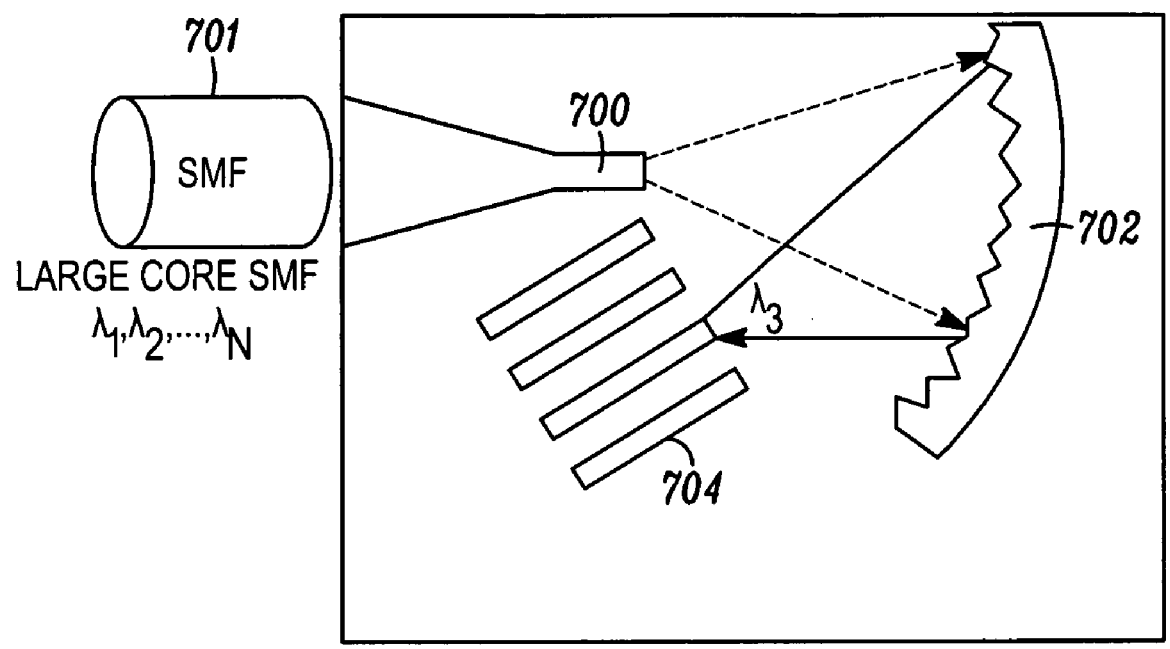
FIG. 7 is a top down view of a photonic chip including the dual taper waveguide and other IC devices.

FIG. 7 shows a top down view of an example integrated silicon photonic chip that contains a large size taper 700 as described for coupling light from a fiber 701. In addition to the taper 700 also integrated may be an Echelle grating 702, and a Ge detector array 704. Such a chip may be used as a component for Tbits/s WDM based optical links. Embodiments of this invention make this type of chip fabrication practical.

The taper loss of the proposed taper structures has been modeled by use of Beam Propagation Method. With a taper height of 20 um, final waveguide height of 5 um, and a tip width of 0.5 um, which can be easily achieved with current lithographic technology, the taper loss is <0.2 dB with a taper length of 5 mm. Because the taper and the final waveguide size is relative large, scattering loss may be minimal. Further, since the wafer bonding technique is commercially available, the proposed taper can be practically fabricated with the existing manufacturing technology.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
a handle wafer;
a first tapered waveguide;
a second tapered waveguide;
the first tapered waveguide and the second tapered waveguide disposed on the handle wafer such that the first tapered waveguide is on top of the second tapered waveguide
and a smooth surface of the first tapered waveguide is exposed; and a rib waveguide positioned over said smooth surface of the first tapered waveguide, wherein the second tapered waveguide has a shorter length than the first tapered waveguide and the first tapered waveguide has a shorter length than the rib waveguide; and wherein the handle wafer is on an opposite side of the apparatus with respect to the rib waveguide.

2. The apparatus as recited in claim 1, further comprising: additional integrated circuits formed on the smooth surface.

3. The apparatus as recited in claim 2, wherein the additional integrated circuits comprise gratings.

4. The apparatus as recited in claim 2, wherein the additional integrated circuits comprise photodetectors.

5. The apparatus as recited in claim 1 wherein the first tapered waveguide and the second tapered waveguide and the rib waveguide are formed with an inverted silicon on insulator (SOI) wafer.

6. The apparatus as recited in claim 5 wherein the SOI wafer is bonded to the handle wafer.

* * * * *

UNITED STATES PATENT AND TRADEMARK OFFICE
CERTIFICATE OF CORRECTION

Page 1 of 1

PATENT NO.        : 8,000,565 B2
APPLICATION NO.   : 12/347069
DATED             : August 16, 2011
INVENTOR(S)       : Ansheng Liu It is certified that error appears in the above-identified patent and that said Letters Patent is hereby corrected as shown below:

In column 1, line 4, before FIELD OF THE INVENTION, please insert the following:

--STATEMENT OF GOVERNMENT INTEREST

This invention was made with Government support under contract number H98230-08-3-0011 awarded by the Department of Defense. The Government has certain rights in this invention.--

Signed and Sealed this
Fifteenth Day of March, 2016

Michelle K. Lee
*Director of the United States Patent and Trademark Office*